Patented July 25, 1950

2,516,679

UNITED STATES PATENT OFFICE 2,516,679

PROCESS FOR PRODUCING ACETALS OF ALDEHYDES CONTAINING AT LEAST FOUR CARBON ATOMS

John W. Copenhaver, Easton, Pa., assignor to General Aniline & Film Corporation, New York, N. Y., a corporation of Delaware No Drawing. Application November 5, 1948, Serial No. 58,624

4 Claims. (Cl. 260—611)

This invention relates to a method for producing acetals of aldehydes containing at least 4 carbon atoms.

I have found that alkylidene diethers of the type disclosed in U. S. Patent No. 2,165,962 and those disclosed in my copending application Serial No. 762,213 filed July 19, 1947, are readily reduced without affecting the acetal linkage with hydrogen in the presence of acids and a noble metal hydrogenation catalyst such as platinum or palladium under low hydrogen pressure and at room or slightly elevated temperatures.

The reaction involved in the process of the present invention may be formulated as follows:

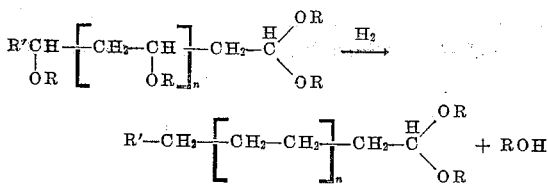

wherein R and R' represent the same or different hydrocarbon radicals chosen from the group consisting of alkyl, aryl and aralkyl radicals, and $n$ is a whole number, including 0, generally less than 10 and more usually less than 5.

The detailed operation of the process of the present invention will be apparent to those skilled in the art from a consideration of the following specific examples:

Example I

A shaking pressure vessel was charged with 42 grams (0.2 mol) of 1,1,3-trimethoxy-3-phenyl propane and 1 gram of hydrogenation catalyst consisting of 10% palladium on charcoal. The vessel was purged with hydrogen and 1 gram of anhydrous hydrogen chloride added, and the reduction carried out at 60 pounds per square inch, hydrogen pressure and at room temperature. The reduction took place rapidly with the theoretical pressure drop taking place in about 30 minutes. The reaction mixture was filtered to remove the catalyst and made alkaline with sodium methoxide. The reaction products were then distilled to give the dimethyl acetal of hydrocinnamyl aldehyde (boiling point 104° C./12 mm., $n_D^{25}$ 1.4950). This reaction product was characterized by reaction with 2,4-dinitrophenyl hydrazine to give a 2,4-dinitrophenyl hydrazone (melting point 158° C.).

Analysis calculated for $C_{15}H_{14}N_4O_4$: C 57.32; H 4.49; N 17.83. Found: C 57.10; H 4.38; N 17.88.

A mixed melting point with a known 2,4-dinitrophenyl hydrazone prepared from hydrocinnamyl aldehyde showed no depression.

Example II 148 grams (1 mol) of 1,1,3-trimethoxy butane, 5 grams of hydrogenation catalyst consisting of 10% palladium on charcoal and 1 gram of anhydrous hydrogen chloride were placed in a shaking pressure vessel and reduced at 60 pounds per square inch, hydrogen pressure and at room temperature. The reduction occurred slowly, but after 20 hours the pressure drop indicated that reduction was essentially complete. The reaction mixture was filtered to remove the catalyst, the hydrogen chloride neutralized with sodium methoxide, and a good yield of dimethyl butyral (boiling point 114° C., $n_D^{25}$ 1.3900) isolated by fractional distillation. The reaction product was characterized by conversion to the 2,4-dinitrophenyl hydrazone of butyraldehyde.

In carrying out the process of the present invention, it has been found that the noble metal hydrogenation catalysts such as platinum and palladium hydrogenation catalysts are most effective for effecting the desired reduction, since the reaction does not go so well with Raney nickel catalysts. Such noble metal hydrogenation catalysts are preferably employed on carriers, such as charcoal, pumice and the like, but may of course, be employed in an unsupported state, if desired.

It has also been found desirable to avoid high temperatures and high hydrogen pressures in carrying out the reaction, since if too high a temperature or pressure is employed, the acetal linkage will begin to be reduced. It is therefore desirable to keep the temperature below 160° C. and, in fact, the reaction goes quite well at room temperature. The hydrogen pressure should also be kept below 400 pounds per square inch and, as indicated by the specific examples, hydrogen pressures are from 50–100 pounds per square inch, i. e. about 60 pounds per square inch have been found satisfactory.

As indicated by the specific examples, the reaction is carried out in an acidic medium, either a small amount of mineral acids such as hydrogen chloride, phosphoric acid, sulfuric acid, and the like, or an acid reacting salt such as zinc chloride, cadmium chloride, sodium bisulfate or an organic acid such as acetic acid, p-toluene sulfonic acid, and the like being present in the reaction mixture. However, the reaction should be carried out under essentially anhydrous conditions in order to avoid cleavage of the acetal group, since in the presence of water and preferably at slightly higher hydrogen pressures and possibly temperatures, the acetal group is also reduced as indicated in my copending application Serial No. 58,625, filed November 5, 1948.

As previously stated, the process of the present invention is applicable to the reduction of alkylidene diethers of the type illustrated in the equation given above. As examples of such diethers may be mentioned, in addition to those of the specific examples, other lower 1,1,3-trialkoxy butanes such as 1,1,3-triethoxy butane, 1,1-dimethoxy-3-ethoxy butane, 1,3-dimethoxy-1-ethoxy butane, 1,1,3-trimethoxy-5-ethoxy hexane, 1,1-dimethoxy-3,5-ethoxy hexane, 1,1-dimethoxy-3,5,7-ethoxy octane, and the like.

While the lower alkoxy acetals are preferably employed in practicing the process of the present invention, it will be apparent that aryloxy and aralkoxy acetals may also be employed, if desired. As examples of such compounds containing one or more aryloxy or aralkoxy radicals may be mentioned 1-phenoxy-1,3-dimethoxy butane, 1,1-dimethoxy-3-phenoxy butane, 1,1-dimethoxy-3-benzyloxy butane, and the like.

I claim:

1. The method of producing acetals of aldehydes containing at least 4 carbon atoms which comprises subjecting an acetal of the formula:

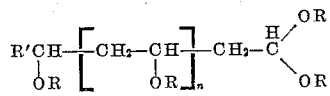

wherein R and R' represent hydrocarbon radicals selected from the group consisting of alkyl, aryl and aralkyl radicals, and $n$ is an integer of from 0 to 10, to the action of hydrogen at a pressure of from 50 to 400 pounds per square inch and at a temperature of from 20–160° C. in the presence of a noble metal hydrogenation catalyst under acidic anhydrous conditions.

2. The process of producing acetals of aldehydes containing at least 4 carbon atoms which comprises subjecting a 1,1,3-trialkoxy alkane to the action of hydrogen at a pressure of from 50 to 400 pounds per square inch and at a temperature of from 20–160° C. in the presence of a noble metal hydrogenation catalyst under acidic anhydrous conditions.

3. The process of producing acetals of butyraldehyde which comprises subjecting a 1,1,3-tri-lower alkoxy butane to the action of hydrogen at a pressure of from 50 to 400 pounds per square inch and at a temperature of from 20–160° C. in the presence of a noble metal hydrogenation catalyst under acidic anhydrous conditions.

4. The process of producing acetals of hydrocinnamyl aldehyde which comprises subjecting 1,1,3-tri-lower alkoxy-3-phenyl propane to the action of hydrogen at a pressure of from 50 to 400 pounds per square inch and at a temperature of from 20–160° C. in the presence of a noble metal hydrogenation catalyst under acidic anhydrous conditions.

JOHN W. COPENHAVER.

REFERENCES CITED

The following references are of record in the file of this patent:

UNITED STATES PATENTS

| Number | Name | Date |
|--------|------|------|
| 2,165,962 | Cunradi | July 11, 1939 |